(12) United States Patent
Shih et al.

(10) Patent No.: US 9,395,808 B2
(45) Date of Patent: Jul. 19, 2016

(54) IDENTIFICATION SYSTEM, PHYSICAL APPARATUS, IDENTIFICATION APPARATUS, AND IDENTIFICATION METHOD OF PHYSICAL APPARATUS

(71) Applicant: Wistron Corporation, New Taipei (TW)

(72) Inventors: Wen-Hui Shih, New Taipei (TW); Chih-Chuan Kung, New Taipei (TW)

(73) Assignee: Wistron Corporation, New Taipei (TW)

( * ) Notice: Subject to any disclaimer, the term of this patent is extended or adjusted under 35 U.S.C. 154(b) by 365 days.

(21) Appl. No.: 14/078,511

(22) Filed: Nov. 12, 2013

(65) Prior Publication Data

US 2015/0054530 A1 Feb. 26, 2015

(30) Foreign Application Priority Data

Aug. 26, 2013 (TW) .............................. 102130456 A (51) Int. Cl.
*G01R 27/26* (2006.01)
*G01R 31/02* (2006.01)
*G06F 3/00* (2006.01)

(52) U.S. Cl.
CPC ....................................... *G06F 3/00* (2013.01)

(58) Field of Classification Search
CPC ....... H01Q 1/50; G01N 17/02; G01N 27/902; G01R 27/32; G01R 31/021; G01R 31/11; G01R 35/005; G01S 13/18; Y10T 29/49826
USPC .................. 324/527, 532–534, 691
See application file for complete search history.

(56) References Cited

U.S. PATENT DOCUMENTS 5,821,747 A * 10/1998 Atherton et al. .............. 324/220
7,989,986 B2     8/2011 Baarman et al.
(Continued)

FOREIGN PATENT DOCUMENTS

CN     1545769     11/2004
TW     200843284   11/2008
TW     201329462    7/2013

OTHER PUBLICATIONS

EP application 12183754.6 Detection Apparatus and Method (Oct. 9, 2012).*
"Office Action of Taiwan Counterpart Application" with partial English translation, issued on Jun. 3, 2015, p. 1-p. 5.

*Primary Examiner* — Vincent Q Nguyen
(74) *Attorney, Agent, or Firm* — Jianq Chyun IP Office (57) ABSTRACT

An identification system, a physical apparatus, an identification apparatus, and an identification method of the physical apparatus are provided. The identification system includes the physical apparatus and the identification apparatus. The physical apparatus has a path circuit disposed to an identification detecting pin. The identification apparatus transmits a probe signal to the identification detecting pin and then receives a reflected signal, wherein the reflected signal is generated by the probe signal which responds to an impedance characteristic of the path circuit. The identification apparatus obtains identification information of the physical apparatus according to the impedance characteristic of the path circuit which is responded by the reflected signal. The identification system of the present invention can reduce the number of pin for identifying and effectively utilize the impedance characteristic of the physical apparatus to identify identification information.

14 Claims, 6 Drawing Sheets

(56) References Cited

U.S. PATENT DOCUMENTS

| | | |
|---|---|---|
| 2002/0172329 A1 | 11/2002 | Rashid-Farrokhi et al. |
| 2010/0153029 A1* | 6/2010 | Miskell et al. .................. 702/55 |
| 2012/0104868 A1* | 5/2012 | Baarman et al. ............... 307/104 |
| 2014/0211241 A1 | 7/2014 | Rice et al. |

* cited by examiner

IDENTIFICATION SYSTEM, PHYSICAL APPARATUS, IDENTIFICATION APPARATUS, AND IDENTIFICATION METHOD OF PHYSICAL APPARATUS

CROSS-REFERENCE TO RELATED APPLICATION

This application claims the priority benefit of Taiwan application serial no. 102130456, filed on Aug. 26, 2013. The entirety of the above-mentioned patent application is hereby incorporated by reference herein and made a part of this specification.

BACKGROUND

1. Field of the Invention

The present invention is directed to an identification technique and more particularly, to an identification system, a physical apparatus, an identification apparatus and identification method of the physical apparatus.

2. Description of Related Art

In recent years, accessories of various products, such as earphones and stylus pens accompanying with electronic products, replaceable consumables corresponding to biomedical apparatuses and so on, have become more and more diverse. Because different accessories have different specifications, product developers would respectively set configurations corresponding to the different specifications using a host terminal. Meanwhile, in order to protect the interests of customers by preventing them from purchasing accessory products that are not provided from the original manufacturers, the product developers also have to carefully consider how a product is capable of detecting whether an accessory specification is compliable with settings of the original manufacturers. Thus, in order to make the host terminal capable of identifying different accessories, the product manufactures typically design host apparatuses to be capable of reading identification information of accessories and adjust the configurations correspondingly according to identification information of the accessories.

For instance, a product developer commonly store identification information of an accessory in a memory, such as an electrically erasable programmable read only memory (EEPROM), and reads the identification information from the host apparatus using power and multi-purpose pins, such as a ground pin, a signal transmission pin, a signal receiving pin and so on. Alternatively, the product developer may add a designed resistor circuit to the accessory, such that host apparatus may input a specific voltage into the resistor circuit to obtain a voltage-divided signal for identifying the identification information of the accessory. However, in the aforementioned identification techniques, two or more pins are required, which results in the increase of the product cost. Accordingly, how to make the host apparatus to identify the identification information of the accessory in an easy way as well as to reduce the product cost are major issues to be resolved in the technique proposed by the present invention.

SUMMARY

The present is directed to an identification system, a physical apparatus, an identification apparatus and an identification method of the physical apparatus, by which the number of pins for identification detecting can be reduced, and identification information is identified according to impedance characteristics of the path circuit in the physical apparatus.

The present invention is directed to an identification system. The identification system includes a physical apparatus and an identification apparatus. The physical apparatus has a path circuit. The path circuit is coupled to an identification detecting pin. The identification apparatus transmits a probe signal to the identification detecting pin and receives a reflected signal through the identification detecting pin. The reflected signal is generated by the probe signal which responds to an impedance characteristic of the path circuit. Since the impedance characteristic of the path circuit can be known according to the reflected signal, the identification apparatus obtains identification information of the physical apparatus according to the impedance characteristic of the path circuit.

In an embodiment of the present invention, the impedance characteristic of the path circuit includes at least one trace length.

In an embodiment of the present invention, the path circuit includes at least two trace loads with different impedance characteristics which are electrically connected with each other.

In an embodiment of the present invention, the identification apparatus includes an impedance characteristic identification list and obtains the identification information of the physical apparatus according to the impedance characteristic identification list.

In an embodiment of the present invention, the identification apparatus includes a signal retriever configured to retrieve and analyze the reflected signal.

According to another perspective, the present invention is directed to a physical apparatus. The physical apparatus includes a main body and a trace load apparatus. The main body has an identification detecting pin. The trace load apparatus has a path circuit coupled to the identification detecting pin. When the probe signal is transmitted to the identification detecting pin, the reflected signal is generated by the probe signal which responds to the impedance characteristic of the path circuit. The identification information of the physical apparatus is obtained from the impedance characteristic of the path circuit which is responded by the reflected signal.

According to yet another perspective, the present invention is directed to an identification apparatus suitable for identifying a physical apparatus having an identification detecting pin. The identification apparatus includes a signal generating unit and a signal analyzing unit. The signal generating unit transmits a probe signal to the physical apparatus through the identification detecting pin and receives a reflected signal through the identification detecting pin. The reflected signal is generated by the probe signal which responds to an impedance characteristic of the path circuit. The signal analyzing unit obtains identification information of the physical apparatus according to the impedance characteristic of the path circuit which is responded by the reflected signal.

According to still another perspective, the present invention is directed to an identification method of the physical apparatus. The identification method includes the following steps. A probe signal is transmitted to an identification detecting pin of the physical apparatus, wherein the physical apparatus has a path circuit coupled to the identification detecting pin. A reflected signal is received through the identification detecting pin, wherein the reflected signal is generated by the probe signal which responds to an impedance characteristic of the path circuit. Identification information of the physical apparatus is obtained according to the impedance characteristic of the path circuit which is responded by the reflected signal.

Based on the above, the identification apparatus of the present invention utilizes a time domain reflectometry (TDR) technique to transmit a probe signal to an identification detecting pin of a physical apparatus to be tested and obtain an impedance characteristic of the path circuit in the physical apparatus according to the reflected signal generated by the probe signal. Thus, the identification apparatus can use the impedance characteristic of the path circuit as the identification information of the physical apparatus, and thereby, the number of pins for identification detecting can be significantly reduced.

In order to make the aforementioned and other features and advantages of the present invention more comprehensible, several embodiments accompanied with figures are described in detail below.

BRIEF DESCRIPTION OF THE DRAWINGS

The accompanying drawings are included to provide a further understanding of the present invention, and are incorporated in and constitute a part of this specification. The drawings illustrate embodiments of the present invention and, together with the description, serve to explain the principles of the present invention.

DESCRIPTION OF EMBODIMENTS

In order to reduce the number of pins for identification detecting, the present invention proposes an identification system, a physical apparatus, an identification apparatus and an identification method of the physical apparatus. The identification apparatus in the identification system transmits/receives a signal through an identification detecting pin of the physical apparatus. A transmitted signal is responded by an impedance characteristic of an internal circuit in the physical apparatus to generate a reflected signal. The identification apparatus obtains the impedance characteristic of the internal circuit according to the received reflected signal so as to obtain identification information of the physical apparatus. Thereby, a developer no longer needs a plurality of pins to identify identification information of an accessory, which facilitates in the design of accessory identification information for the developer. Several embodiments in compliance with the spirit of the present invention are illustrated below, but do not construe any limitations to the present invention.

Figure 1:
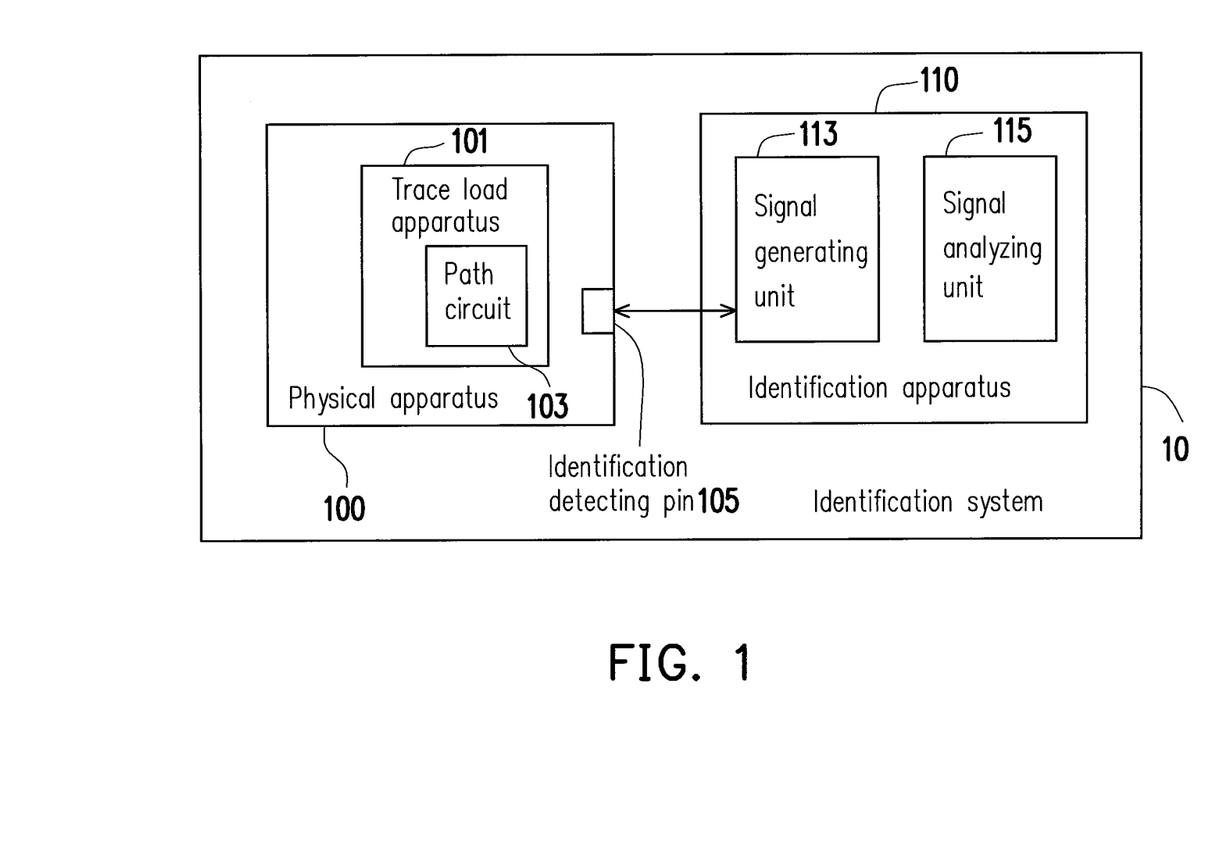
FIG. 1 is a block diagram illustrating an identification system according to an embodiment of the present invention.

FIG. 1 is a block diagram illustrating an identification system according to an embodiment of the present invention. With reference to FIG. 1, an identification system 10 includes a physical apparatus 100 and an identification apparatus 110. The identification apparatus 110 is coupled to an identification detecting pin 105 of the physical apparatus 100. A cable is disposed between the identification apparatus 110 and the physical apparatus 100 and operated with a connector for electrical connection, communication, detection and an accessing operation, such as a coaxial cable operated with a N-type of a bayonet neill concelman (BNC) type connector or a twisted pair operated with a RJ-45 connector. In an embodiment, the identification apparatus 110 may be coupled with the identification detecting pin 105 of the physical apparatus 100 using a probe, instead of a connector. However, depending on a transmission interface adopted by a person who applies the embodiments of the present invention, the way of coupling the physical apparatus 100 with the identification apparatus 110 is not limited in the present invention. If the identification apparatus 110 and the identification detecting pin 105 of the physical apparatus 100 are coupled with each other using the probe, a signal may be input and output merely by using a single contact as one pin. Thereby, an objective of the present invention, in which the physical apparatus 100 is identified by the identification system using the minimum number of pins, can be achieved.

In the present embodiment, the identification apparatus 110 utilizes a time domain reflectometry (TDR) technique for identifying the physical apparatus 100. The TDR technique is applied on measuring an impedance characteristic, such as an impedance, a trace length of a load or the like, for a printed circuit board (PCB) or any other device. In the present embodiment, the probe signal is transmitted to an endpoint of an internal circuit in the PCB or any other device by utilizing the TDR technique, and then a reflected signal is generated by the endpoint through the probe signal which responds to the internal circuit. By doing so, the developer may retrieve and analyzes the reflected signal using a signal retriever and obtains impedance characteristics of the internal circuit by observing the reflected signal.

Figure 2A:
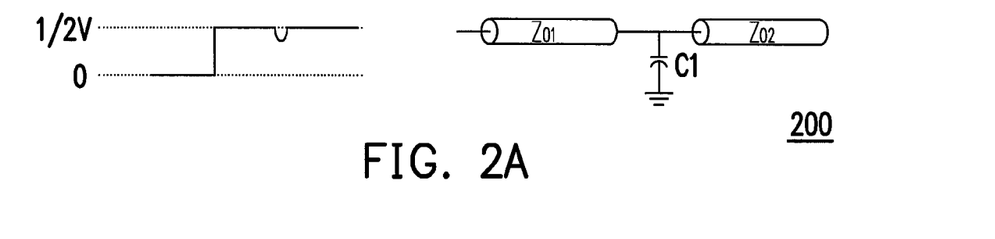
FIG. 2A through FIG. 2H are schematic diagrams of measuring different path circuits utilizing the time domain reflectometry (TDR) technique.

FIG. 2A through FIG. 2H are schematic diagrams of measuring different path circuits utilizing the TDR technique. With reference to FIG. 2A, if it is assumed that the reflected signal has a voltage of ½ V in response to an impedance $Z_{01}$ (referring to left in FIG. 2A), the reflected signal is affected by a capacitor $C_1$ in parallel when a slight decline appears in a waveform of the reflected signal. Then, if the waveform of the reflected signal is raised back to ½ V, it may be determined that the reflected signal passes through an impedance $Z_{02}$ in series. Accordingly, by observing the waveform, it may be known that a shunt C discontinuity type path circuit 200 is disposed (referring to the right in FIG. 2A).

Figure 2B:
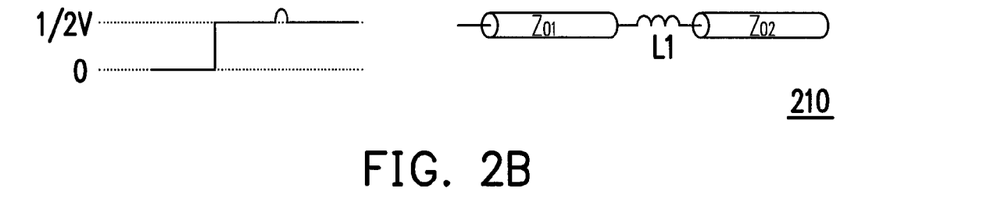
Figure 2C:
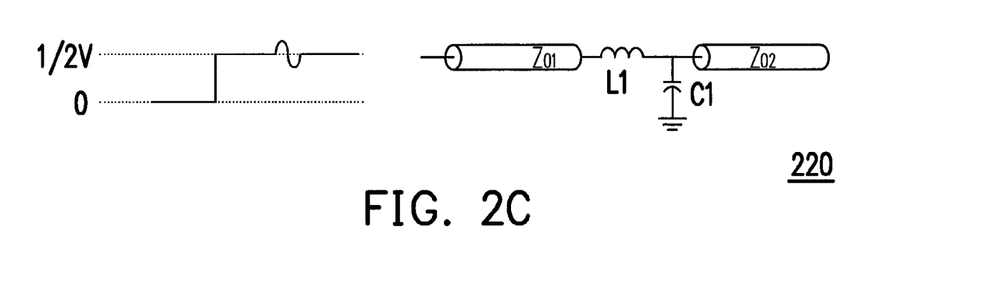
Figure 2D:
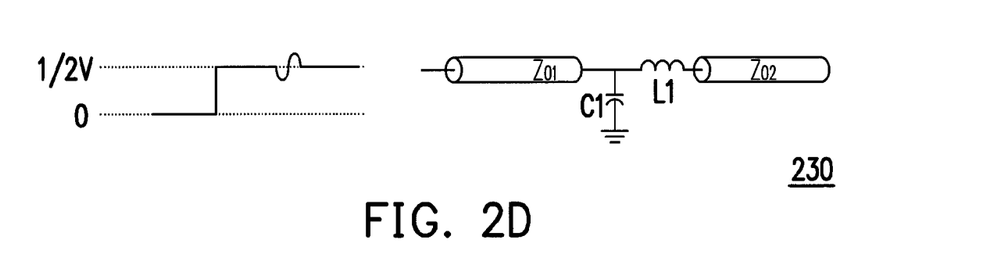
Figure 2E:
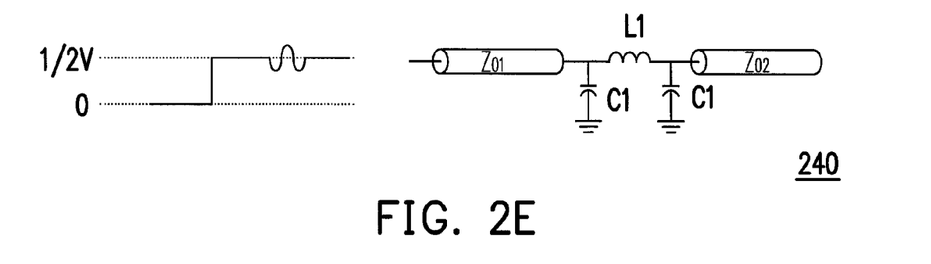
Figure 2F:
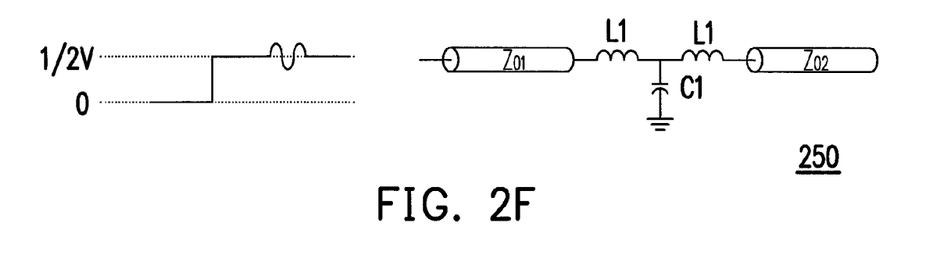

With reference to FIG. 2B, if it is assumed that the reflected signal has a voltage of ½ V in response to the impedance $Z_{01}$ (referring to left in FIG. 2B), the reflected signal is affected by an inductor $L_1$ in series when a slight rise appears in the waveform of the reflected signal. Then, if the reflected signal is declined back to ½, it may be determined that the reflected signal passes through an impedance $Z_{02}$ in series. Accordingly, by observing the waveform, it may be known that a series L discontinuity type path circuit 210 is disposed (referring to the right in FIG. 2B).

FIG. 2C through FIG. 2F schematically illustrate path circuits 220, 230, 240 and 250 consisting of impedances, capacitors and inductors connected in different serial or parallel forms (referring to the right of FIG. 2C through FIG. 2F) and a waveform of each of the path circuits 220, 230, 240 and 250 in response to the reflected signal (referring to the left of FIG. 2C through FIG. 2F). Since the waveforms of the reflected signal in response to the capacitor in parallel and the inductor in series has been described with reference to FIG. 2A and FIG. 2B, the related descriptions of FIG. 2C through FIG. 2F may refer to the descriptions related to FIG. 2A and FIG. 2B above.

Figure 2G:
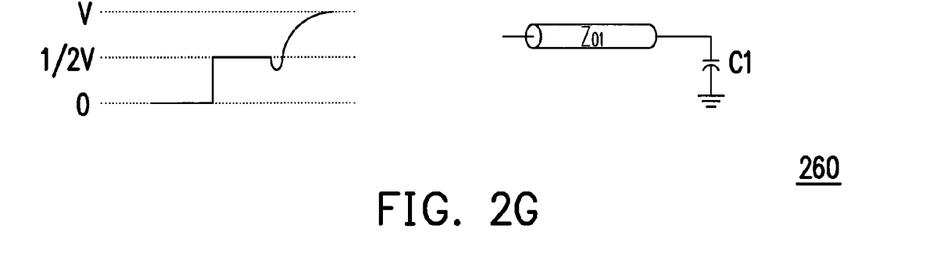

With reference to FIG. 2G, if it is assumed that the reflected signal has a voltage of ½ V in response to the impedance $Z_{01}$ (referring to the left of FIG. 2G), the reflected signal is affected by the capacitor $C_1$ in parallel when a decline appears in the waveform of the reflected signal. Then, if the voltage of the reflected signal is rapidly raised to 1 V, it is known that an open circuit appears. Accordingly, by observing the waveform, it may be known that a capacitive termination type path circuit 260 is disposed (referring to the right in FIG. 2G).

Figure 2H:
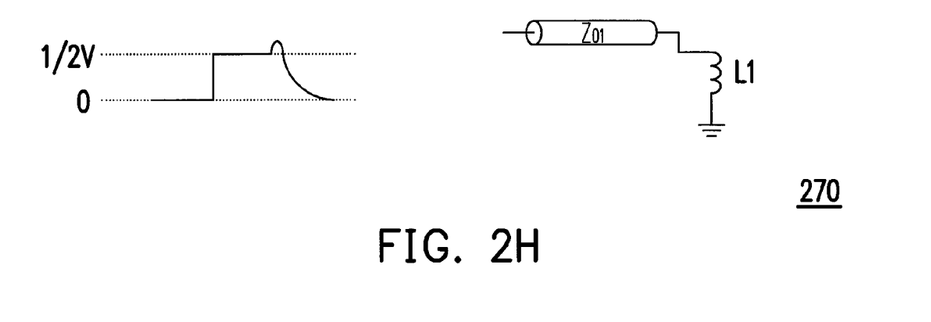

With reference to FIG. 2H, if it is assumed that the reflected signal has a voltage of ½ V in response to the impedance $Z_{01}$ (referring to left in FIG. 2H), the reflected signal is affected by the inductor $L_1$ in series when a rise appears in the waveform of the reflected signal. Then, when the voltage of the reflected signal is rapidly dropped down to 0, it is known that a short circuit appears. Accordingly, by observing the waveform, it may be known that an inductive termination type path circuit 270 is disposed (referring to the right in FIG. 2H).

According to the descriptions related to FIG. 2A through 2H above, different path circuits may respond to different changes in the waveforms of the reflected signal. Therefore, the technique may be applied to the design of the identification information based on the present embodiment so as to design path circuits with different electrical devices or to previously store a comparison table of path circuits of the physical apparatus 100 in the identification apparatus 110. Additionally, when utilizing the TDR technique to identify the identification information of the physical apparatus 100, the identification apparatus 110 transmits and receives signals using only one transmission pin (e.g., the identification detecting pin 105), without providing additional power supply for measurement.

Referring again to FIG. 1, the physical apparatus 110 includes a trace load apparatus 101. The trace load apparatus 101 includes a path circuit 103 coupled with the identification detecting pin 105. The physical apparatus 110 may be any path circuit electronic apparatus having various electrical devices, such as an earphone, a microphone, a speaker, a replaceable consumable for biomedical apparatuses or the like.

The identification apparatus 110 includes a signal generating unit 113 and a signal analyzing unit 115. The signal generating unit 113 and the signal analyzing unit 115 may be chipsets, microprocessors or micro control units (MCU) with computing capabilities. The signal generating unit 113 and the signal analyzing unit 115 are processing units or microprocessors configured to process all tasks of the identification apparatus 110 of the present embodiment and may be configured to process all operations with respect to the TDR technique of the present embodiment. The identification apparatus 110 may be an electronic apparatus with capabilities of processing the TDR technique, such as a desktop computer, a tablet computer, a notebook computer, a biomedical apparatus or the like.

In light of the foregoing, the utilization of the TDR technique is convenient for the developer to know about the impedance characteristics of the path circuit. An identification method for the physical apparatus 100 of the present embodiment will be described in detailed hereinafter, such that the developer may identify the identification information of the physical apparatus 100 using the identification apparatus 110 with the capabilities with respect to the TDR technique.

Figure 3:
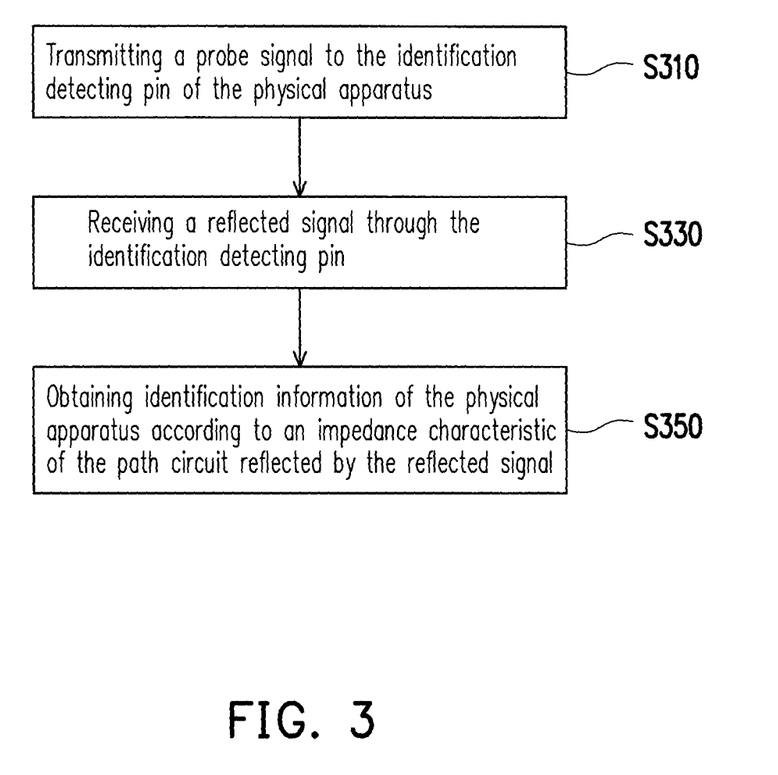
FIG. 3 is a flowchart of an identification method of the physical apparatus of the identification system according to an embodiment of the present invention.

FIG. 3 is a flowchart of an identification method of the physical apparatus 100 of the identification system 10 according to an embodiment of the present invention. With reference to FIG. 3, the identification method of the present embodiment is suitable for the identification system 10 depicted in FIG. 1. Hereinafter, the description of the identification method of the present embodiment will be set forth with reference to each element of the identification system 10, and each step of the method may be adjusted according to implementation scenarios, and is not limited to the illustration herein.

In step S310, the signal generating unit 113 of the identification apparatus 110 transmits a probe signal to the identification detecting pin 105 of the physical apparatus 100. The physical apparatus 100 includes a path circuit 103 coupled to the identification detecting pin 105. To be detailed, the signal generating unit 113 includes a probe signal generator, such as a step pulse voltage generator, for generating the probe signal). Since the identification apparatus 110 is coupled to the identification detecting pin 105 of the physical apparatus 100, the probe signal is transmitted to the path circuit 103 through the identification detecting pin 105.

In step S330, the signal generating unit 113 of the identification apparatus 110 receives a reflected signal through the identification detecting pin 105. The reflected signal is generated by the probe signal which response to an impedance characteristic of the path circuit 103. To be detailed, since the path circuit 103 may be a circuit consisting of different impedances, capacitors and inductors, the reflected signal is generated by the probe signal passing through a position with impedance change when impedance discontinuity occurs. The reflected signal is transmitted along a path in opposite to the path of transmitting the probe signal, thus, the signal generating unit 113 may receive the reflected signal through the identification detecting pin 105.

In step S350, the signal analyzing unit 115 obtains the identification information of the physical apparatus 100 according to an impedance characteristic of the path circuit 103 which is reflected by the reflected signal. To be detailed, the reflected signal is generated due to the impedance change, and thus, different impedance characteristics are responded to the waveforms of the reflected signal. The signal analyzing unit 115 may sample the reflected signal using a signal sampler and perform an operation on the reflected signal to obtain the identification information of the physical apparatus 100. For example, an operation of calculating a trace length or a value of an impedance of a load of the path circuit 103 may be performed.

In an embodiment, the identification apparatus 110 includes an impedance characteristic identification list, such that the signal analyzing unit 115 may obtain the identification information of the physical apparatus 100 according to the impedance characteristic identification list. For instance, the developer may store a plurality of impedance characteristics corresponding to physical apparatuses 100 of various manufacturers in the impedance characteristic identification list, such that the signal analyzing unit 115 may analyze the identification information generated according to the reflected signal and compare it with the impedance characteristic identification list to determine whether the currently identified physical apparatus 100 is a product of his/hers. Alternatively, the developer may store impedance characteristics corresponding to the physical apparatuses 100 of different models in the impedance characteristic identification list so as to analyze the identification information generated according to the reflected signal and compare it with the impedance characteristic identification list to determine whether the currently identified physical apparatus 100 belongs to a specific model.

In another embodiment, the identification apparatus 110 may also include a signal retriever configured to retrieve and analyze the reflected signal. For instance, the signal retriever may retrieve and analyze a waveform of the reflected signal based on timing and then display the waveform of the reflected signal using a viewing equipment, such as an oscilloscope or present values with respect to the analyzed reflected signal using an electronic instrument, such that the developer may determine whether the identification information of the currently identified physical apparatus 100 is correct by observing the waveform or the values.

The impedance characteristic of the currently identified of the physical apparatus 100 may be obtained by utilizing the TDR technique. Thus, in an embodiment, the impedance characteristic of the path circuit 103 depicted in FIG. 1 at least includes a trace length. An embodiment illustrating how to identify the identification information of the physical apparatus 100 of FIG. 1 using the trace length will be exemplarily described below.

Figure 4A:
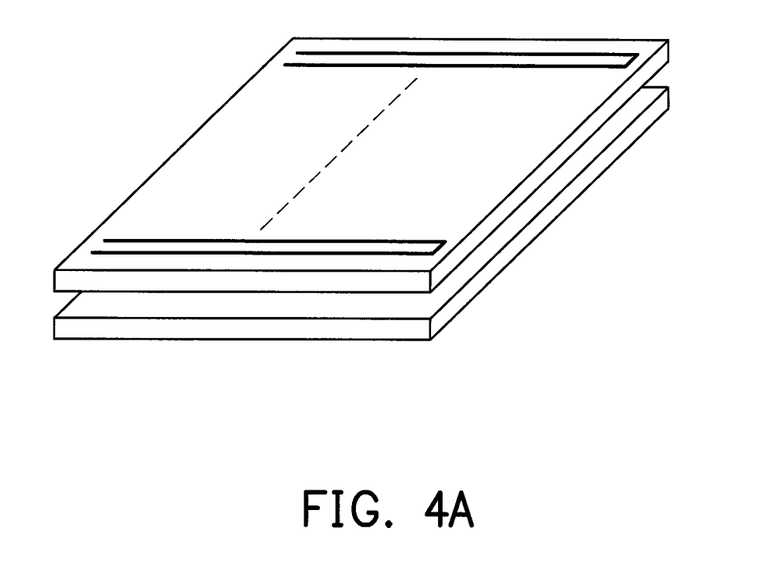
FIGS. 4A and 4B are schematic diagrams of obtaining the identification information using a trace length of the impedance characteristic according to an embodiment of the present invention.
Figure 4B:
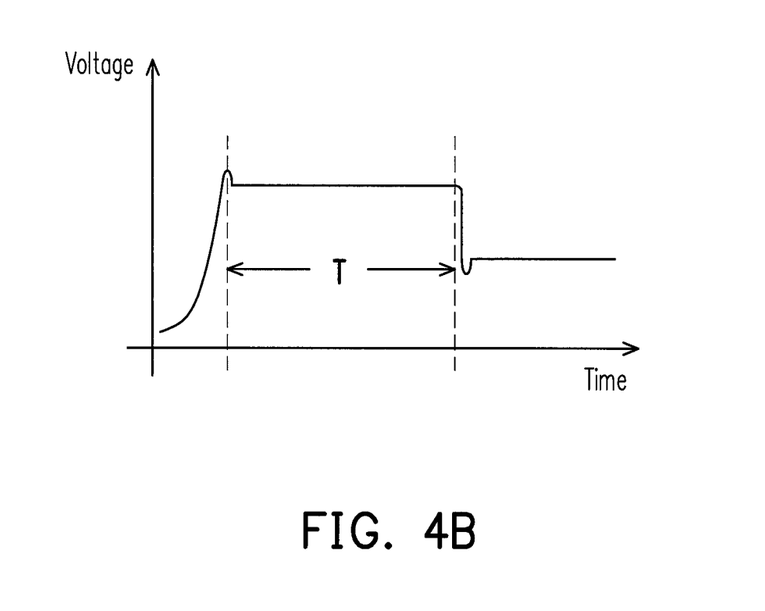

FIGS. 4A and 4B are schematic diagrams of obtaining the identification information using a trace length of the impedance characteristic according to an embodiment of the present invention. First, referring to FIG. 4A, FIG. 4A illustrates a common multi-layer printed circuit board (PCB). For instance, if a load trace on the PCB is designed based on a line width of 4 mils, a load trace with a length of 50 cm may be configured on an area of 1 cm$^2$.

FIG. 4B illustrated a waveform of a reflected signal generated by the probe signal transmitted in the identification apparatus 110 depicted in FIG. 1 and passing through the path circuit of the PCB depicted in FIG. 4A. Observing from FIG. 4B, the waveform of the reflected signal contains a smooth waveform of a reflection time delay T. The reflected signal varies with the impedance of the path circuit, and thus, when the smooth waveform appears in the waveform of the reflected signal, it is known that the reflected signal does not yet pass through the position with the impedance change. Additionally, by measuring a time length of the reflection time delay T, a corresponding trace length may be estimated according to formula (1) below:

$$L = T \times P \times \frac{1}{2} \quad (1)$$

Therein, L is a trace length, and P is a wire conductance parameter. In a scenario where the wire conductance parameter P is 7.79 inches per nanoseconds (ns), and given that the trace length L is 50 inches, the reflection time delay T may be estimated as 12.84 ns according to formula (1), or alternatively, given that the trace length L is 100 inches, the reflection time delay T may be estimated as 25.67 ns according to formula (1). However, it should be known that the wire conductance parameter P may depend on the impendence adopted by the person who applies the present embodiment, and the wire conductance parameter P is not limited in the present invention.

Since the length of a part of the trace in the path circuit may be estimated by way of measuring a part of the waveform of the reflected signal, the developer may configure different identification information on the PCB or any other element depicted in FIG. 4A using different trace length combinations, or alternatively, determine whether the identification information belongs to a default model according to the measured trace length.

In another embodiment, the path circuit 103 depicted in FIG. 1 includes trace loads including at least two different impedance characteristics which are electrically connected with each other. An embodiment illustrating how to identify the identification information of the physical apparatus 100 of FIG. 1 using trace loads of different impedance characteristics will be exemplarily described below.

Figure 5:
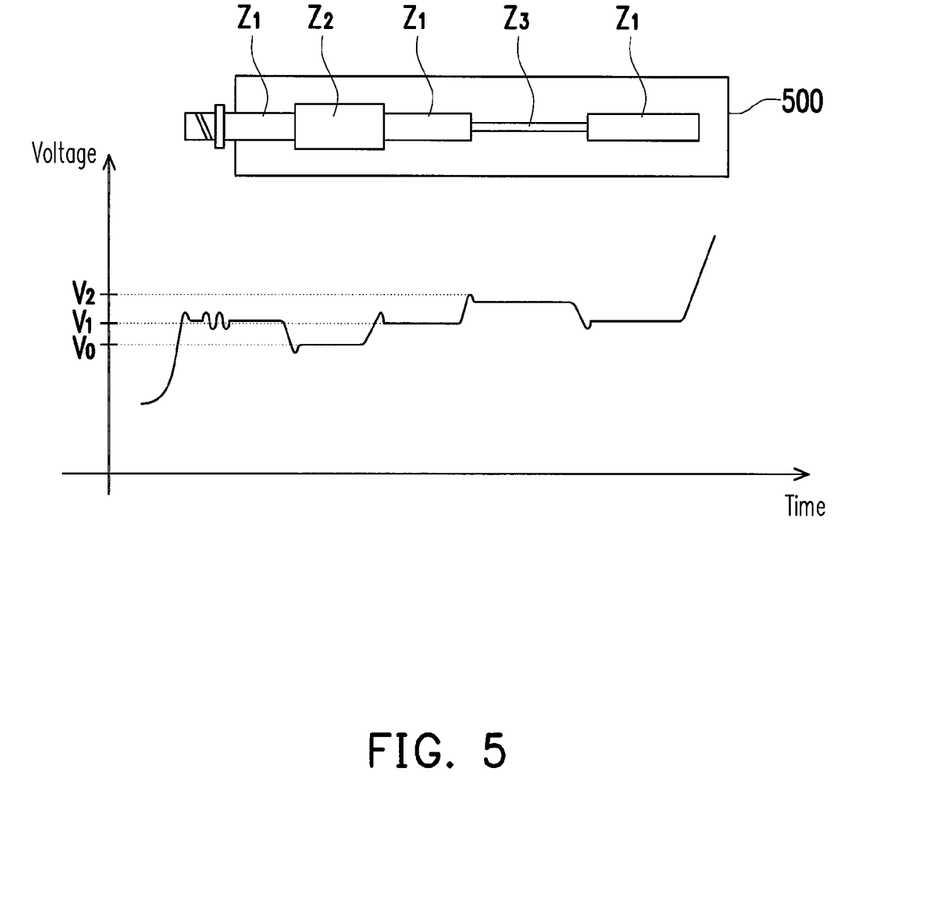
FIG. 5 is a schematic diagram of identifying the identification information by trace loads with different impedance characteristics according to an embodiment of the present invention.

FIG. 5 is a schematic diagram of identifying the identification information by trace loads with different impedance characteristics according to an embodiment of the present invention. With reference to FIG. 5, a physical apparatus 500 includes a path circuit consisting of impedances $Z_1$, $Z_2$ and $Z_3$. The lower part of FIG. 5 illustrates a waveform of the reflected signal generated by the probe signal transmitted by the identification apparatus 110 depicted in FIG. 1 passing through a path circuit of the physical apparatus 500. It can be observed from FIG. 5 that a voltage level of the impedance $Z_2$ corresponding to the waveform of the reflected signal is $V_0$, a voltage level of the impedance $Z_1$ corresponding to the waveform of the reflected signal is $V_1$, and a voltage level of the impedance $Z_3$ corresponding to the waveform of the reflected signal is $V_2$.

Generally speaking, before estimating a value of each of the impedances in the path circuit according to the waveform of the reflected signal, a reflection coefficient ρ has to be calculated according to formula (2) below:

$$\rho = V_{re}/V_{in} \quad (2)$$

Therein, $V_{re}$ is a voltage of the reflected signal and $V_{in}$ is a voltage of the probe signal. Taking the voltage $V_1$ obtained by measuring an impedance 510 as an example, the voltage $V_1$ is a sum of the voltage $V_{re}$ of the reflected signal and the voltage $V_{in}$ of the probe signal. Given that a resistance value of an interface coupling the identification apparatus 110 and the physical apparatus 500 in FIG. 1 is $Z_C$, an impedance value of the impedance $Z_1$ may be calculated according to formula (3), which is $$V_1 = V_{in}(1 + (Z_1 - Z_C)/(Z_1 + Z_C)) \quad (3) \text{ and}$$

formula (4), which is $$Z_1 = Z_C(V_1/V_{in})/((V_1/V_{in}) + 2) \quad (4).$$

Given that the resistance value $Z_C$ of the coupling interface is greater than the impedance $Z_1$, it can be known from formula (3) that the voltage $V_{in}$ of the probe signal is greater than the voltage $V_1$ of the impedance $Z_1$.

Based on the embodiment above, the developer may design trace loads of different impedance characteristics in the path circuits of the accessories or set up the impedance characteristic identification list according to the path circuits of the accessories, such that the developer can identify the identification information of accessories conveniently.

To sum up, the identification apparatus of the identification system of the present invention transmits/receives signals through the identification detecting pin in the physical apparatus and obtains the identification information of physical apparatuses according to the received signals. By doing so, the identification system of the embodiments of the present invention can obtain the identification information using a single identification detecting pin and facilitates the developer in identifying and designing the identification information of the physical apparatuses according to the impedance characteristics of the physical apparatuses.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. An identification system, comprising:
    a physical apparatus, having a path circuit coupled to an identification detecting pin; and
    an identification apparatus, transmitting a probe signal to the identification detecting pin and receiving a reflected signal through the identification detecting pin, wherein the reflected signal is generated by the probe signal which responds to an impedance characteristic of the path circuit, and the identification apparatus obtains identification information of the physical apparatus according to the impedance characteristic of the path circuit which is responded by the reflected signal,
    wherein the path circuit comprises at least two trace loads with different impedance characteristics which are electrically connected with each other.

2. The identification system according to claim 1, wherein the impedance characteristic of the path circuit comprises at least one trace length.

3. The identification system according to claim 1, wherein the identification apparatus comprises an impedance characteristic identification list and obtains the identification information of the physical apparatus according to the impedance characteristic identification list.

4. The identification system according to claim 1, wherein the identification apparatus comprises a signal retriever configured to retrieve and analyze the reflected signal.

5. A physical apparatus, comprising:
    a main body, having an identification detecting pin; and
    a trace load apparatus, having a path circuit coupled to the identification detecting,
    wherein when a probe signal is transmitted to the identification detecting pin, a reflected signal is generated by the probe signal which responds to an impedance characteristic of the path circuit, the identification information of the physical apparatus is obtained according to the impedance characteristic of the path circuit which is responded by the reflected signal,
    wherein the path circuit comprises at least two trace loads with different impedance characteristics which are electrically connected with each other.

6. The physical apparatus according to claim 5, wherein the impedance characteristic of the path circuit comprises at least one trace length.

7. An identification apparatus, suitable for identifying a physical apparatus having an identification detecting pin, comprising:
    a signal generating unit, transmitting a probe signal to the physical apparatus through the identification detecting pin and receiving a reflected signal through the identification detecting pin, wherein the reflected signal is generated by the probe signal which responds to an impedance characteristic of the path circuit; and
    a signal analyzing unit, obtaining identification information of the physical apparatus according to the impedance characteristic of the path circuit which is responded by the reflected signal,
    wherein the path circuit comprises at least two trace loads with different impedance characteristics which are electrically connected with each other.

8. The identification apparatus according to claim 7, wherein the impedance characteristic of the path circuit comprises at least one trace length.

9. The identification apparatus according to claim 7, wherein the identification apparatus comprises an impedance characteristic identification list and obtains the identification information of the physical apparatus according to the impedance characteristic identification list.

10. The identification apparatus according to claim 7, wherein the identification apparatus comprises a signal retriever configured to retrieve and analyze the reflected signal.

11. An identification method of the physical apparatus, comprising:
    transmitting a probe signal to an identification detecting pin of the physical apparatus, wherein the physical apparatus has a path circuit coupled to an identification detecting pin;
    receiving a reflected signal through the identification detecting pin, wherein the reflected signal is generated by the probe signal which responds to an impedance characteristic of the path circuit; and
    obtaining identification information of the physical apparatus according to the impedance characteristic of the path circuit which is responded by the reflected signal,
    wherein the path circuit comprises at least two trace loads with different impedance characteristics which are electrically connected with each other.

12. The identification method according to claim 11, wherein the impedance characteristic of the path circuit comprises at least one trace length.

13. The identification method according to claim 11, wherein the step of obtaining the identification information of the physical apparatus according to the impedance characteristic of the path circuit which is responded by the reflected signal comprises:
    obtaining the identification information of the physical apparatus according to the impedance characteristic identification list.

14. The identification method according to claim 11, further comprising:
    retrieving and analyzing the reflected signal by using signal retriever.

* * * * *